(No Model.)
T. LEE.
DUST SEPARATOR.
No. 458,773.  Patented Sept. 1, 1891.
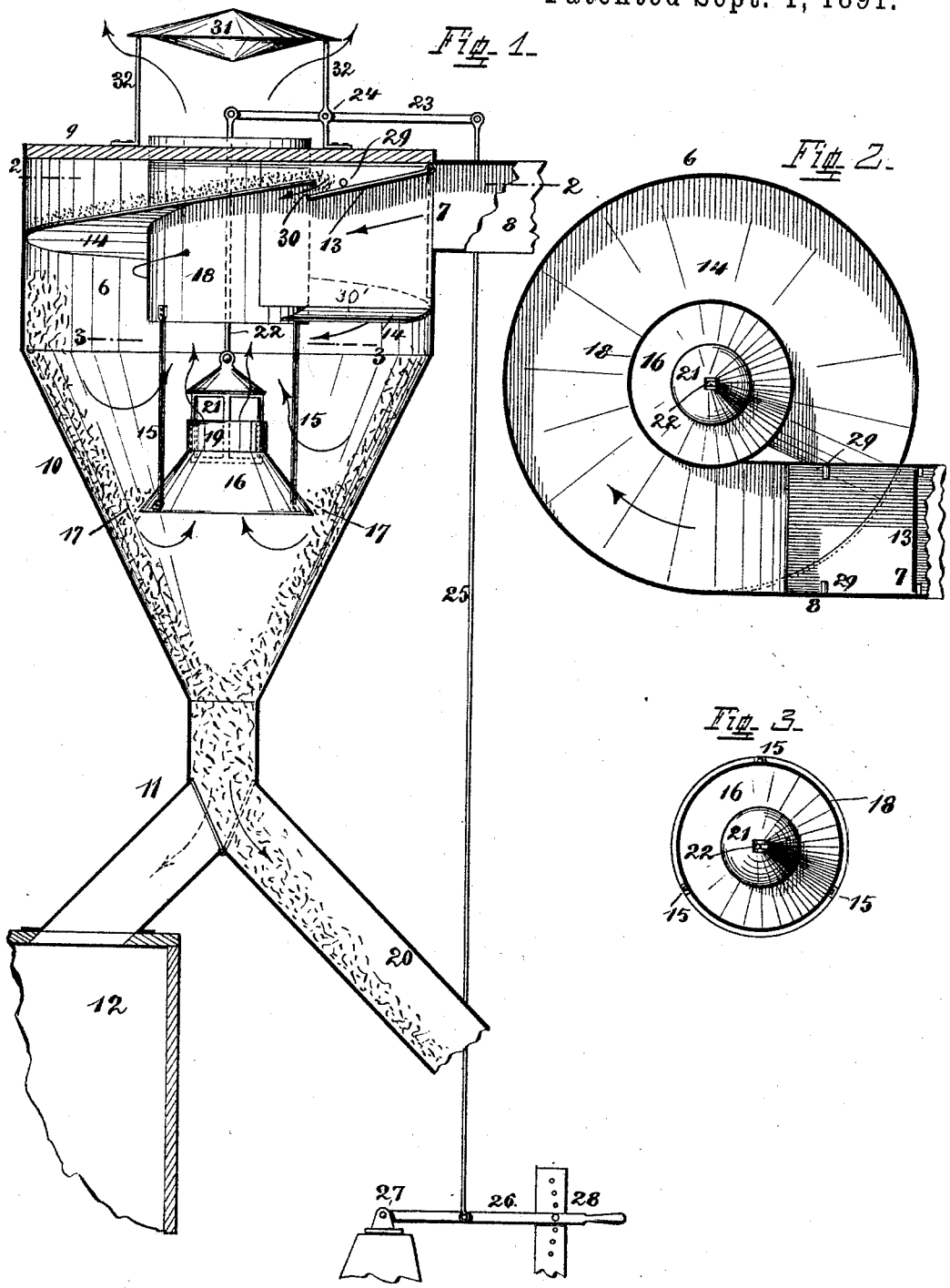
Attest
Chas. E. Prior.
Edgar Wilson.
Inventor
Thomas Lee.
by Carl Spengel Atty

UNITED STATES PATENT OFFICE.

THOMAS LEE, OF HOME CITY, OHIO.

DUST-SEPARATOR.

SPECIFICATION forming part of Letters Patent No. 458,773, dated September 1, 1891.

Application filed May 5, 1891. Serial No. 391,633. (No model.)

*To all whom it may concern:*

Be it known that I, THOMAS LEE, a citizen of the United States, residing at Home City, in the county of Hamilton and State of Ohio, have invented certain new and useful Improvements in Dust-Separators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a device which is used for the purpose of separating prior to its deposit waste—such as dust, shavings, &c.—from the air-current, which carries it to a waste or dust chamber or shavings-house, where it is finally collected.

In manufacturing establishments, where considerable waste is made during the ordinary run of business, it becomes necessary, in order to prevent its rapid accumulation, to carry this waste away as fast as it appears, and this is generally done by providing a number of conduits the open ends of which are placed adjacent to the sources where the dust and shavings are produced. By means of a fan or blower a strong suction is created in these conduits, causing all the waste to be drawn into their open ends as fast as made. These different conduits generally unite into one, which carries the waste to a collecting-chamber, from which it is finally disposed of in a suitable way, or where its nature permits its use as fuel it is carried to the boiler-furnace. The dust-separator is placed in this latter general conduit, and immediately before the deposit or waste chamber is reached. It is essential that at this point the air-current is diverted and completely drawn away from the waste, so as to prevent any downward drafts and agitation of the latter after once settled in the waste-chamber. In the case of shavings, and where they are used as fuel under the boilers, they are directly supplied to the latter through a conduit connecting with the separator, and in which case a part of the main current of sufficient strength is used to move the shavings from the latter to the fire. The larger part of the volume of the air-current is diverted in the separator, as before, it being too strong to be fully admitted to the furnace, where it would seriously interfere with the fire. Thus it will be noticed that there are cases where it is essential that the current should be completely diverted before the waste-chamber is reached, while in other cases, especially such where the waste is used as fuel, a fraction of this current is admitted and used to move the waste to the place of its consumption. This fraction of the main current so used should be of a strength which is barely sufficient to move the shavings and not stronger, because all excess of strength would be detrimental to the operation of the boiler-furnace and cool the boilers.

The size and weight of the waste varies sometimes, and therefore it is obvious that the same fractional current will not do for all purposes, and it becomes necessary to provide means to regulate its strength or to cut it off completely in cases where such is necessary; to provide means for such regulation and cutting off; to guide the dust and waste-laden air-current to the separator in the proper way; to prevent the accumulation of fine dust within the separator and in places through which the direct current does not pass; to provide means by which rain is prevented from entering the inside of the device and causing the dust to cake, the same means also serving as a deflector for the escaping air; to close the separator automatically after stoppage of the fan or blower, so as to cut off communication from the waste-chamber to the main buildings through the conduits to prevent the spread of fire, are the objects of my invention, and I attain them by a construction specifically designed for the purpose, and explained in the following description, and illustrated in the accompanying drawings, in which—

Figure 1 is a vertical section through the separator and adjacent parts. Figs. 2 and 3 are horizontal sections taken on lines 2 2 and 3 3 of Fig. 1, respectively.

The material mostly used in the manufacture of this device is tin or sheet-iron for the body, which latter connects to a wooden head at its upper end. The upper part of the body is cylindrical, as shown at 6, and contains the ingress-opening 7 for the waste-laden air-current entering through the general conduit 8, which joins the body on a tangential line, and into which the different conduits from the establishment (not shown here) converge. The upper end of this cylindrical body is closed by a head 9, preferably of wood, and at its lower end joins the balance of the main body, the latter being substantially of the shape of a funnel, as shown at 10. A discharge-spout 11 joins onto this latter and enters a chamber 12, where all the waste is collected. The ingress-opening 7 is closed by an automatic valve 13, which drops down when the current passing through conduit 8 stops, thus shutting off communication between the waste-chamber and the system of conduits leading to the main buildings, and so forming one of the precautions against the spread of fire. As soon as the current is started it raises up this valve to an inclined position, as shown, and in which position it forms a deflector to give the current a downward start. This start is generally sufficient; but the current may be guided a little further by a spiral guide 14.

In the conical part of the body and supported on rods 15 is located a hollow cone 16, which forms the separator proper. The waste-laden current assumes and follows the circular shape of the body, the waste by centrifugal force being driven close against the walls of the former, so that in its downward course it will more or less completely fill and close the annular space at 17 between the body 10 and the separator 16 and prevent the air from also passing through and between this space. The air strikes the separator 16, is diverted by it, and passes upwardly through a central flue 18 out to the open air. The down-passing waste does, however, not always completely fill and close the space at 17, in which case a part of the current passes on down past and below the separator 16. To prevent this escaped air from entering the waste-chamber and keeping the settling waste therein in agitation, the separator is provided with a central opening in its apex at 19, through which such air may pass back again and join the main upward current. All moving air is thus separated, and the waste drops through spout 11 into the waste-chamber merely by its own weight, accumulating therein, and from whence it is periodically removed. In cases where the waste consists of shavings, which are used as fuel, connection is made with the furnace under the boilers by means of a pipe 20, leading to spout 11.

A suitable cut-off valve is provided at the junction of pipe 20 and spout 11, whereby connection to the waste-chamber is cut off.

Part of the air-current entering the separator is permitted to pass below and escape to the furnace through the pipe 20, carrying the shavings with it, and thus acting as an automatic feed to supply the fire. This fractional air-current is obtained by providing opening 19 in the separator 16 with a valve or governor 21, supported on a rod 22, depending from one end of a lever 23, which latter is pivoted at 24. The other end of this lever connects by means of a rod 25 to a lever 26, pivoted at 27 and provided with means of adjustment. (Shown at 28.) By these means opening 19 in the separator may be closed, thereby cutting off the upward escape of that part of the main air-current which has passed with the shavings below the separator, and which is thus utilized to move the shavings through spout 11 and pipe 20 to the boiler-furnace. In case this fractional current should be too strong and interfere with the fire part of it may be permitted to escape upwardly by raising valve 21, whereby outlet 19 is partly opened. As will be seen, no live air enters above the spiral guide 14, the waste-laden current passing in and under it.

Excepting provision made for its prevention, an accumulation and deposit of fine dust, which fills the whole interior of the separator, would take place on top of the spiral guide, where it is outside of the flow of the current. This dust is often saturated with oil and highly inflammable, and if permitted to accumulate becomes inclined to self-combustion and explosion. Its deposit is prevented by an induced air-current created on the upper side of the spiral guide, and whereby the presence of any dead-air pockets inside of the device is avoided. This air-current is produced by the following construction: Between the upper end of spiral guide 14 and head 9 there is a suitable space left. When the valve 13 is raised to its highest position, it is prevented from resting against the upper end of the spiral guide by the interposition of suitable stops 29. An opening 30 is thus provided between valve 13 and the upper end of spiral 14, and the air-current rushing past it creates a suction at this opening and draws the air out through it, and thus creates a constant secondary current, which carries all dust with it into the main current and prevents its accumulation. This secondary current joins the main current through an opening 30', provided above the lower end of spiral guide 14, and similar to the opening at the upper end of the latter.

It is very desirable that rain should be excluded from the interior of the device, because in cases where the waste consists of dust it causes the same to cake and stick against the inside walls. This is prevented by the provision of a hood 31, which is formed in the shape of two cones connected at their bases, and in this manner serves as a combined rain excluder and deflector for the escaping air. It is supported on standards 32, rising from head 9.

Having described my invention, I claim as new—

1. In a dust-separator, the general construction, as follows: a main body provided with ingress and discharge openings, a head covering the top and serving as a floor to support the standards of a rain-hood, and also as a means from which to suspend a central flue, a conical separator suspended by rods from this central flue, open at its apex and provided thereat with a cylindrical valveway, and a sliding valve to regulate the size of this opening, all substantially as shown and described.

2. In a dust-separator, the general construction, as follows: a main body provided with ingress and discharge openings, a head covering the top and serving as a floor to support the standards of a rain-hood, and also as a means to suspend a central flue therefrom, a conical separator open at its apex, provided at this opening with a valveway and suspended by rods from this central flue, a sliding valve to regulate the size of said opening, and a spiral guide or deflector starting below the head and near the ingress-opening and traversing the space between the central flue and the main body, all substantially as shown and described.

3. In a dust-separator, the general construction, as follows: a main body provided with ingress and discharge openings, a head covering the top of it and serving as a floor to support the standards of a rain-hood, and also as a means to suspend a central flue therefrom, a conical separator open at its apex and provided at this opening with a valveway and suspended by rods from this central flue, a sliding valve to regulate the size of said opening, and a swinging deflector suspended above the ingress-opening, giving the entering air-current a downward start and acting as an automatic valve to close said opening as soon as the entering air-current stops, all substantially as shown and described.

4. In a dust-separator, the combination of the main body, substantially of a funnel shape, having an ingress-opening near its top and a discharge-spout at its lower end, with the separator proper suspended within the former and in the lower portion thereof and substantially of conical shape, having an opening in its apex, its lower edge approaching the interior of the body to within a suitable distance to permit the waste only to pass, but cutting off the air, a central flue through which the diverted air-current passes and from which the separator is suspended by suitable rods, and a valve or governor sliding within and regulating the size of the opening in the separator and provided with means for adjusting and fixing its position, all substantially as shown, and for the purposes described.

5. In a dust-separator, a main body substantially of funnel shape, having an ingress-opening near its top and a discharge-spout at its lower end, and provided with the deflector 13, swinging in a vertical plane, and stops 29, against which the latter is kept by the force of the entering air-current, which is deflected by it, so as to assume its proper direction, said deflector acting also as a valve to close automatically the ingress-opening when the air-current is cut off, all substantially as shown, and for the purposes described.

6. In a dust-separator, a main body substantially of funnel shape, having an ingress-opening near its top and a discharge-spout at its lower end, a spiral guide, under which the waste-laden current passes and is guided downwardly by it, the swinging deflector 13 and stop 29, the former completing in its raised position the guide for the entering wind, but kept from the end of guide 14 by stops 29, so as to form an interruption in the guiding-surface through which the dust accumulating on the upper surface of the spiral guide may be drawn back by the suction caused by the entering main current, all substantially as shown, and for the purposes described.

In testimony whereof I affix my signature in presence of two witnesses.

THOMAS LEE.

Witnesses:
CHAS. E. PRIOR,
CARL SPENGEL.